United States Patent [19]

Stacy et al.

[11] 4,359,342

[45] Nov. 16, 1982

[54] SILICA REINFORCED RUBBER

[75] Inventors: Carl J. Stacy; Jerold D. Wood, both of Bartlesville, Okla.

[73] Assignee: Phillips Petroleum Company, Bartlesville, Okla.

[21] Appl. No.: 229,211

[22] Filed: Jan. 28, 1981

[51] Int. Cl.$^3$ ................................................ C09C 1/28
[52] U.S. Cl. .............................. 523/216; 106/308 Q; 106/308 N; 106/288 B
[58] Field of Search ............ 106/288 B, 288 I, 308 Q, 106/308 N; 260/42.14, 42.15, 42.16, 42.47

[56] References Cited

U.S. PATENT DOCUMENTS 3,567,680 3/1971 Iannicelli ........................... 260/41.5
3,737,334 6/1973 Doran et al. ..................... 106/288 Q
3,994,742 11/1976 Russell et al. ................... 106/288 Q
4,076,550 2/1978 Thurn et al. ..................... 106/288 Q
4,099,981 7/1978 Mui et al. ......................... 106/308 Q
4,151,157 4/1979 Williams et al. ................. 106/308 N
4,156,677 5/1979 Williams et al. ................. 106/308 N
4,208,316 6/1980 Nauroth et al. ................. 106/308 Q
4,297,145 10/1981 Wolff et al. ...................... 106/308 Q Primary Examiner—James Poer

[57] ABSTRACT

Incorporating a reinforcement promoter into the silica prior to the drying of the silica which is precipitated has been found to result in a significant improvement of the heat buildup properties of rubber reinforced by such silica as compared to adding both silica and the promoter to the rubber mixture.

6 Claims, No Drawings

SILICA REINFORCED RUBBER

BACKGROUND OF THE INVENTION

Both natural rubber and alkadiene based synthetic rubbers are useless for many purposes unless reinforced. Many different reinforcing and cross-linking agents have been developed in the art for rubbers. Sulfur curing of rubber is a technology that has been discovered very early. Using carbon black for reinforcement purposes in rubber is a very widespread technology today. A third approach to the problem of reinforcing rubber is the incorporation of mineral fillers such as silica or certain clays.

Silicas and clays are often used with organosilane additives whose function is to improve certain properties of the rubber.

The various reinforcing agents for rubber are developed with respect to specific properties of the rubber reinforced by those compositions. One of the important properties of a reinforced rubber is its hysteresis, i.e. its tendency to convert mechanical energy into heat. This property is very significant for instance for the rubber components of automotive tires. Tires are subjected to very significant mechanical working by bending and stretching. Mechanical losses result in heat build-up which may be severe enough to cause failure of the tire. Even when no such failure occurs the dissipation of energy increases fuel consumption of the vehicle on which tires are mounted.

THE INVENTION

It is thus one object of this invention to provide a process for the production of reinforcing silica.

Another object of this invention is to provide a new rubber reinforcing agent based on silica.

A still further object of this invention is to provide a new reinforced rubber composition which has improved heat buildup or hysteresis properties as compared to rubber compositions containing a different reinforcing agent.

These and other objects, details, features, embodiments and advantages of this invention will become apparent to those skilled in art from the following detailed description of the invention and the appended claims.

In accordance with this invention it has now been found that a promoter-modified silica can be obtained by adding the promoter to the silica during a specified period of the silica production process and that thereby a reinforcing agent is obtained which is superior to a comparable reinforcing agent which has the promoter added to the finished silica.

More specifically, and in accordance with a first embodiment of this invention there is provided a process to produce a silica reinforcing agent. In this process, silica is precipitated from an aqueous silicate solution by adding acid in a conventional manner to form a silica comprising slurry. Into the slurry a reinforcing promoter is incorporated either during or after the precipitation but prior to any heat treatment of the silica contained in the slurry. The so-obtained promoted silica is then recovered from the slurry. In accordance with this invention it has been found that the heat buildup of a rubber composition reinforced by such a promoted silica is reduced very significantly as compared to a similar rubber composition containing silica and the promoter separately added to the rubber composition.

A further embodiment of this invention is promoted silica obtained by the process of this invention. The exact structure of the promoted silica is presently unknown. It is, however, believed that some kind of an interaction between the promoter and the silica in statu nascendi is achieved which results both in a very excellent distribution of the promoter within the silica and in a locking of the promoter to the silica particles.

A third embodiment of this invention resides in a rubber composition which comprises rubber selected from the group of natural rubber as well as silica reinforceable synthetic polymers and copolymers, and the promoted silica described. More specifically yet the promoted silica is used in quantity of 25 to 60 parts by weight per 100 parts by weight of rubber. The rubber composition may contain in addition to the promoted silica reinforcement agent further typical additives such as antioxidants, UV stabilizers, pigments, plasticizers, extender oils, accelerators, vulcanizing agents, other fillers, processing oils, and the like. The quantity of these other additives is conventional. The nature of the further additives will generally be such as not to interfere with the reinforcing effect of the silica or the promoting effect of the reinforcement promoter used.

A further embodiment of this invention resides in a process for the production of a reinforced rubber article. In this process rubber and the promoted silica are mixed at a temperature well below the activating or reaction temperature of the promoter with the rubber. This mixture is then shaped into the article and subjected to the activating temperature whereby a reinforced rubber article is obtained. Generally, the upper limit for the temperature for the mixing step in connection with silica reinforcement is 350° F. Preferably, the rubber and the promoted silica are mixed at a temperature in the range of 280° to 330° F. An example for an article so formed would be an automobile tire.

PROMOTER

It is presently believed that the specific promoter used in this invention is not critical. The promoter can be defined as a chemical compound having at least one first molecular moiety that exhibits an affinity to silica or that is capable of attaching itself to the silica "in statu nascendi", and at least one second molecular moiety that is capable of forming a bond with a carbon atom, preferably by reacting with the ethylenic carbon-carbon double bond in the polymer. This second moiety can also be described as having a crosslinking or coupling function. These first and second moieties in the promoter molecule are preferably separated by a hydrocarbyl moiety. Silyl configurations, phosphonate groups, carboxyl groups are examples of the first molecular moiety, and azido radicals, thiosulfenamide groups, thiol groups, trithiocarbonate groups, sulfenyl dithiocarbonate groups, sulfenate ester configurations and di- and tetrasulfide configurations are examples of the second molecular moiety. Usually the promoter molecules have not more than three of each of the first and second moiety and generally contain not more than 80 carbon atoms.

A variety of promoters are given in the following to exemplify the above definition without undue limitation of the scope of the invention:

(a) Silyl compounds defined by the formulae $$(RO)_{3-n}R_n^1Si-Q-Y \quad (I)$$

wherein
Y is
(1) —N₃ (azide) or
(2) —S—S—NR₂ (thiosulfenamide) or
(3) —SH (mercaptan) or
(4)

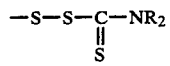

(sulfenyl dithiocarbamate) or
(5) —(S—S)$_m$—Q—Si R$_n^1$ (OR)$_{3-n}$ (disulfides, tetrasulfides) or
(6) —S—O—R¹ (sulfenate)

Q is alkylene, cycloalkylene, arylene or a divalent hydrocarbyl radical being a combination of these and Q having 1 to about 10 carbon atoms, preferably alkylene R¹ is alkyl, cycloalkyl, aryl or a monovalent hydrocarbyl radical being a combination of these, the hydrocarbyl radicals R¹ having 1 to about 10 carbon atoms, R is hydrogen or R¹, with the proviso that the two radicals R connected to nitrogen may also constitute one divalent hydrocarbyl radical forming a cyclic structure with the nitrogen n is 0, 1 or 2
m is 1 or 2.

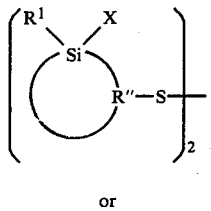

or

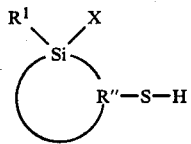

wherein R¹ has the same meaning as in formula (I), X is halogen or —OR¹, alkoxy being the preferred —OR¹ group, R" is a trivalent hydrocarbyl, prefereably alkyl, radical having 2 to 10 carbon atoms and having at least 2 carbon atoms in the sila-ring;

Examples for the various silyl compounds are
I(1) Azides:
trimethoxysilylmethylazide,
2-(trimethoxysilyl)ethylazide,
3-(trimethoxysilyl)propylazide,
4-(trimethoxysilyl)butylazide,
3-(triethoxysilyl)propylazide,
4-(triethoxysilyl)butylazide;
and dimers and trimers of the azide silyl compounds
I(2) Thiosulfenamides;
N,N-dimethyl(trimethoxysilyl)methylthiosulfenamide,
N,N-dimethyl-2-(trimethoxysilyl)ethylthiosulfenamide,
N,N-dimethyl-3-(trimethoxysilyl)propylthiosulfenamide,
N,N-diethyl-3-(triethyoxysilyl)propylthiosulfenamide,
I(3) Mercaptans:
3-trimethoxysilyl propylmercaptan
2-diethoxyethylsilyl propylmercaptan
4-butoxydipropylsilyl n-butylmercaptan
I(4) Sulfenyldithiocarbamates:
3-(Trimethoxysilyl)propylsulfenyl dimethyldithiocarbamate
2-(Dibutoxy-n-propylsilyl)ethylsulfenyl dipropyldithiocarbamate
4-(Propoxydimethylsilyl)butylsulfenyl diethyldithiocarbamate
I(5) Sulfides:
Bis-(3-triethoxysilylpropyl)-tetrasulfide
Bis-(4-dimethoxybutylsilylbutyl)-disulfide
Bis-(2-pentoxydipropylsilylethyl)-tetrasulfide
I(6) Sulfenates:
Methyl-3-(trimethoxysilyl)propylsulfenate
Butyl-4-(diethoxypropylsilyl)butyl sulfenate
Phenyl-2-(propoxydibutylsilyl)ethyl sulfenate
(II) Silacyclic disulfides:
bis(1-chloro-1-methyl-1-sila-3-cyclopentyl)disulfide,
bis(1-chloro-1-ethyl-1-sila-3-cyclopentyl)disulfide,
bis(1-ethoxy-1-methyl-1-sila-3-cyclopentyl)disulfide,
bis(1-ethoxy-1-ethyl-1-sila-3-cyclopentyl)disulfide,
bis(1-chloro-1-methyl-1-sila-3-cyclohexyl)disulfide,
bis(1-chloro-1-methyl-1-sila-4-cyclohexyl)disulfide,
bis(1-methoxy-1-ethyl-1-sila-4-cyclohexyl)disulfide,
bis(1-butoxy-1-butyl-1-sila-4-cyclohexyl)disulfide, Since some of these silyl compounds may not be readily commercially available a brief description how to make these compounds is provided in the following:

The substituted silylhydrocarbylsulfenyl dithiocarbamates I(4) can be prepared by allowing a (mercaptoalkyl)-trihydrocarbyloxysilane, exemplified by (3-mercaptopropyl)-trimethoxysilane, to react with a chlorinating agent, such as sulfuryl chloride, and the resulting (trihydrocarbyloxysilyl)hydrocarbylsulfenyl chloride allowed to react with the product resulting from the reaction of carbon disulfide and a dihydrocarbyl or cyclic secondary amine (such as dimethylamine) to produce the desired substituted silylhydrocarbylsulfenyl dithiocarbamate. The reaction can be carried out at ambient conditions while maintaining the reaction mixture under a suitable inert atmosphere such as nitrogen.

The substituted silylhydrocarbylsulfenate esters I(6) can be prepared by allowing a (mercaptoalkyl)trihydrocarbyloxysilane, such as (3-mercaptopropyl)trimethoxysilane, to react with a chlorinating agent, such as sulfuryl chloride, and the resulting (trihydrocarbyloxysilyl)hydrocarbylsulfenyl chloride allowed to react with an alcohol, such as ethanol, to produce the desired substituted silylhydrocarbylsulfenate ester. The reaction can be carried out at ambient conditions while maintaining the reaction mixture under a suitable inert atmosphere such as nitrogen.

(b) Mercaptohydrocarbyl phosphonates represented by the formula (IV)

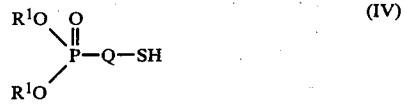

wherein Q and R[1] have the same meaning as defined above in formula (I). Representative of these type compounds are dimethyl mercaptomethylphosphonate
dimethyl 2-mercaptoethylphosphonate
dimethyl 3-mercaptopropylphosphonate
dimethyl 4-mercaptobutylphosphonate
dimethyl 3-mercapto-2-methylpropylphosphonate
dimethyl 3-mercaptodecylphosphonate
dimethyl 10-mercaptodecylphosphonate
dimethyl 3-mercaptotetradecylphosphonate
dimethyl 3-mercaptooctadecylphosphonate
dipropyl 3-mercaptopropylphosphonate
dicyclohexyl 3-mercaptopropylphosphonate
diphenyl 3-mercaptopropylphosphonate
dibenzyl 3-mercaptopropylphosphonate
methylbenzyl 3-mercaptopropylphosphonate (c) Dithiodicarboxylates represented by the formula (V)

$$R^1-OOC-Q-S-S-Q-COO-R^1 \qquad (V)$$

wherein R[1] and Q have the same meaning as in formula (I); specific examples of the dithiocarboxylates are Dimethyldithiodipropionate
Diethyldithiodiacetate
Dicyclohexyl dithiodibutyrate (d) Mercaptocarboxylic acids represented by the formula (VI)

$$HOOC-Q-SH \qquad (VI)$$

Q having the same meaning as in formula (I). Specific examples of the mercaptocarboxylic acids are 3-mercaptopropionic acid
7-mercapto-n-octylic acid
4-mercaptobutyric acid.

SILICA PRECIPITATION

The step of precipitating silica to obtain a slurry with a quasi in statu nascendi silica is conventional. This process step is described in some more detail in U.S. Pat. No. 2,940,830. The preferred process step involves the precipitation of silica from an aqueous alkali metal silicate solution such as water glass by adding to this solution a mineral acid. Examples for alkali metal silicates are sodium silicate and potassium silicate, the sodium silicate being preferred in view of its availability. Examples for mineral acids that can be used for the precipitation of the silica are hydrochloric acid, sulfuric acid, nitric acid.

During the precipitation step a slurry is obtained which contains silica which has never "seen" any air and which is admixed with both water and ions remaining from the precipitation step.

Typical operating conditions for precipitating the silica are temperature 176° to 212° F.
pH (of the final slurry) 8.0
3 N HCl
molar ratio of hydrogen ion of the added acid to alkali ion of the silicate solution 1:1 time 26 to 270 mins.

PROMOTER INCORPORATION

It is an important feature of this invention that the reinforcing promoter is incorporated into the silica at a stage where the silica is still "quasi in statu nascendi". This can be done either by adding the reinforcement promoter to the silicate solution and thereafter precipitating the silica, or by adding the promoter during the acid precipitation to the mixture, or by adding the silicate promoter after the acid precipitation step but prior to any heat treatment of the silica and prior to water removal (drying) of the silica. The reinforcement promoter is generally added in a quantity of 1 to 12 parts by weight per hundred parts by weight of silica precipitated. The specific temperatures and pH conditions of the slurry for adding the reinforcing promoter depends largely upon the nature of the promoter. These conditions will generally be such that the promoter is not subjected to any significant chemical changes by the pH conditions and the temperature alone. The quantity of promoter present in the silica can be determined by elemental analysis. Total sulfur analysis can e.g. be carried out by the high temperature combustion method ASTM D-1552-64. Surface sulfur analysis on the other hand can be accomplished by X-ray photo electron spectroscopy.

SILICA RECOVERY

After a slurry of silica together with the promoter has been obtained this slurry will be usually washed to remove the undesired ingredients produced during the precipitation step. Following such a washing step the slurry mixture is dried to obtain the finished silica reinforcement product.

The washing of the silica and promoter containing slurry is carried out by conventional means. Among the washing fluids useful are alcohols such as isopropyl alcohol. The washing is usually carried out to a degree to remove essentially all of the remaining alkali from the slurry.

The final drying step of the silica is usually carried out at temperatures slightly above the boiling point of water and under reduced pressure.

Other steps which are conventional in this art such as re-slurrying the aqueous slurry obtained during the precipitation step by adding water such as to adjust the pH, and a filtering step prior to the actual drying operation can also be carried out.

RUBBER

The various kinds of rubber that can be reinforced by the reinforcement agent of this invention comprise natural rubber and silica reinforceable polymers and copolymers. Among those polymers and copolymers which can be reinforced by silica are polymers and copolymers of alkadienes of 4-12 carbon atoms. Examples for such synthetic polymers and copolymers are polybutadiene, polyisoprene, block copolymers and random copolymers including tapered copolymers of alkadienes of 4-12 carbon atoms and vinyl aromatic monomers of 8-12 carbon atoms such as butadiene/styrene copolymers.

The rubber composition of this invention generally comprises 100 parts by weight of rubber and 25-60 parts by weight of the promoted silica. Usually the promoter is employed in a quantity of 0.05 to 10 parts by weight, preferably 0.1 to 3 parts by weight, per 100 parts by weight of rubber.

The following examples are intended to illustrate the invention without undue limitation of its scope.

The recipe used in the examples is considered to be conventional (see U.S. Pat. No. 3,798,196, Examples V to VIII) and thus not critical to the successful operation of the invention. The recipe used is shown in Table I.

TABLE I

| Ingredients | Standard Formulation Parts by Weight | Identity of Ingredient |
| --- | --- | --- |
| SBR 1500 | 40 | Emulsion Rubber, 76.5 wt. % butadiene/23.5 wt. % styrene copolymers |
| Treated Silica | 16 | Precipitated silica, treated as described in examples |
| Stearic acid | 0.8 | — |
| Zinc oxide | 1.6 | — |
| Altax (accelerator) | 0.6 | Benzothiazyl disulfide (R. T. Vanderbilt) |
| DPG (accelerator) | 0.6 | Diphenyl guanidine |
| Sulfur | 1.1 | — |

The ingredients in Table I were mixed on a 2-inch laboratory mill. The curing was usually carried out for 30 min. at 160° C.

EXAMPLE I

3-Azidopropyltrimethoxysilane

Reinforcing promoter-modified silica was prepared by slowly adding 3 M HCl to 286 g of water glass (29.3% $SiO_2$ by analysis) diluted with 1260 mL. of water until the pH of the solution reached 8.0. This precipitation reaction was conducted at 100° C. with constant stirring. 3-Azidopropyltrimethoxysilane (3.2 g) was then added with continued stirring and the aqueous slurry maintained at 100° C. for one hour. The precipitated silica was filtered, reslurried with water and the pH adjusted to 7.01. The silica was filtered, washed twice with isopropyl alcohol, and dried at 105° C. under reduced pressure. A control sample of silica was prepared using the same procedure with the exception that no azide was added.

The azide-modified silica and the control silica were evaluated in the standard formulation shown above. An amount of the azide promoter was compounded into the blend containing the control silica at a level which was equivalent to the amount present in the azide-modified silica. Evaluation data for these reinforced rubber samples are shown in Table II.

TABLE II

| Run | CTAB Surface Area, $m^2/g$ | Heat Buildup $\Delta T$, °C. | Resilience % | Tensile Strength, MPa | 300% Modulus MPa | Mooney Viscosity ML-4 | Hardness, Shore A |
| --- | --- | --- | --- | --- | --- | --- | --- |
| a | 90 | 22.2 | 74.5 | 19.7 | 15.7 | 43 | 64 |
| b | 88 | 18.1 | 80.3 | 13.9 | 12.3 | 38 | 62 | a) The azide promoter and non-modified precipitated silica were added separately to the blend during compounding.
b) Azide-modified silica prepared by adding azide to silica slurry following precipitation and prior to heat treatment was compounded into blend.

The results of these comparative runs show a very significant reduction in temperature buildup in the rubber reinforced with the silica reinforcement agent of this invention as compared to a reinforcement agent composed of silica and the same promoter simply added to the finished product. This is a truly surprising result. The other changes shown in the above table are not regarded to be serious deficiencies for the rubber composition, particularly when this composition is intended to be used in applications such as tires where the heat buildup is one of the key considerations.

EXAMPLE 2

3-Trimethoxysilylpropyl 1-thiol

Two runs were made in which 3-trimethoxysilylpropyl 1-thiol (commercially available as A-189 from Union Carbide) was added:

(a) just after the $SiO_2$ was precipitated and (b) during the $SiO_2$ precipitation step. Both of these methods are within the scope of the invention. These silicas were compounded and cured in the "Standard" formulation given above, with the results in Table III showing an improvement over the control with no promoter added and a Hi Sil control with no promoter added. Further, these results show that for A-189 method (a) above was better than method (b) in terms of the promoting effect on reinforcement (better hysteresis properties). There is no true control run wherein A-189 was added to the precipitated silica during compounding in this series. However, the run in which A-189 was added to Hi Sil 233 during compounding using the same cure recipe shows an improvement in hysteresis properties for the invention runs even over this run with a different silica.

TABLE III

| Promoter | Invention Method a) | Invention Method b) | None* | None | A 189** |
| --- | --- | --- | --- | --- | --- |
| Shore A Hardness | 67 | 67 | 69 | 64 | 62 |
| Heat Buildup $\Delta T$, °C. | 22.1 | 24.1 | 33.1 | 25.2 | 24.8 |
| % Resilience | 76.7 | 76.9 | 71.2 | 76.3 | 75.3 |
| Mooney Minimum | 53.5 | 52 | 66.5 | 51 | 74.5 |
| Scorch, 5 pt. rise, (min.) | 3.7 | 6.4 | 9.4 | 7.5 | 3.6 |
| ML-4 (140° C.) | 60.5 | 52 | 68.5 | 51.5 | — |
| Dispersion Rating | 6 | 7 | 4 | 6 | 7 |

*Silica used was Hi Sil 233 ®
**The promoter was added to Hi Sil 233 during compounding.

EXAMPLE 3

Dimethyldithiodipropionate

($CH_3$—OOC—$C_2H_4$—S—S—$C_2H_4$—COO—$CH_3$)

The above compound was added to a silica according to the method (a) of example 2 and compounded in the Standard Formulation. The same compound was added to Hi Sil 233 during compounding which serves as a control in the same manner as described above. The results in Table IV show a large improvement in hysteresis properties for the invention run compared to the above control as well as the controls (Hi SiL 233 and precipitated $SiO_2$) with no promoter added.

TABLE IV

| Promoter | Comparison* | Invention Method (a) | None |
| --- | --- | --- | --- |
| Shore A Hardness | 69 | 62 | 55 |
| Heat Buildup ΔT (°C.) | 35.4 | 19.3 | 33.9 |
| % Resilience | 73.5 | 80.8 | 65.8 |
| Mooney Minimum | 58.0 | 37.0 | 37.0 |
| Scorch 5 pt. rise, (min.) | 13.8 | 9.7 | 18.8 |
| ML-4 (140° C.) | 64 | 39 | 39.0 |
| Dispersion Rating | 4 | 7 | 7 |

*Promoter added to Hi Sil 233 during compounding.

EXAMPLE 4

3-Mercaptopropionic Acid

This compound was added to a silica in the method (a) of example 2 above and compounded in the Standard Formulation. The above compound was also added to Hi SiL 233 during compounding with the results shown in Table V. Comparison of the invention run with the above as a control run shows a large improvement in hysteresis properties for the invention run. The invention run was also better than two Hi Sil 233 controls with no additive present. The control run of Table III had unusually good properties.

TABLE V

| Promoter (1.5 phr) | None* | (c) | Invention |
| --- | --- | --- | --- |
| Shore A Hardness | 64 | 74 | 64 |
| Resilience, % | 71.1 | 70.3 | 77.3 |
| Heat Buildup ΔT, °C. | 30.7 | 39 | 28.9 |
| Dispersion Rating | 6 | 5 | 6 |
| ML-4 (140° C.) | 61.2 | — | 60 |
| Mooney Minimum | 56.6 | 97 | 60 |
| Scorch, 5 pt. rise, min. | 12.4 | 2.6 | 6.5 |

(c) 3-mercapto propionic acid added to Hi Sil 233 during compounding.
*Hi Sil 233 silica

EXAMPLE 5

3-Mercaptopropyldimethoxyphosphonate

This compound was added to a silica in the method (a) of example 2 above and said silica compounded in the Standard Formulation. The above compound was also added to Hi Sil 233 during compounding with the results shown in the following Table VI. Comparison of the in the invention run with the above as a control shows an improvement in hysteresis properties for the invention run. The invention run is also better than the Hi Sil 233 control with no additive present. Note that the control precipitated silica in Table III had unusually good properties.

TABLE VI

| Promoter (1.5 phr) | None* | ESTERS (a) | Invention |
| --- | --- | --- | --- |
| Shore A, Hardness | 66 | 73 | 66 |
| Resilience, % | 70.9 | 74.1 | 75.5 |
| Heat Buildup ΔT, °C. | 32.2 | 34.2 | 29.3 |
| Dispersion Rating | 5 | 5 | 7 |
| ML-4 (140° C.) | 63.9 | — | 62 |
| Mooney Minimum | 58.6 | 99 | 61.2 |
| Scorch, 5 pt. rise, min. | 14.7 | 3.8 | 7.4 |

(a) 3-mercaptopropyl dimethoxy phosphonate added together with Hi Sil 233 during compounding.
*Hi Sil 233 used as the silica.

EXAMPLE 6

Bis-(3-triethyoxysilylpropyl)-tetrasulfide

The above additive commercially available from Degussa under the tradename Si 69 was added in methanol diluent to silicas according to the instant invention in two runs wherein the pH at the point of addition was 8.0 or 4.8. Control precipitated silicas with added methanol but no additive were also obtained. These four silicas were compounded in the Standard Formulation with the results shown in Table VII. The hysteresis properties show the invention runs to be improved in heat buildup over the precipitated silica controls with no additive and about the same in resilience values. The invention runs were also much better than a Hi Sil 233 control with no additive and a Hi Sil 233 control with the additive Si 69 added during compounding. In a further comparative run Si 69 was added to Hi Sil 233 prior to compounding by soaking the silica with an ethanolic solution of Si 69 and then evaporating the ethanol. The invention runs show improved hysteresis properties. Furthermore, comparison of the two control runs using Hi Sil 233 showed no advantage for the prior treatment of Hi Sil 233 with Si 69 as described. This indicates clearly the unexpected nature of the improved results achieved according to the method of the instant invention.

TABLE VII

| Promoter | None (Control) | Invention | None (Control) | Invention | None* | Si 69** | Si 69*** |
| --- | --- | --- | --- | --- | --- | --- | --- |
| pH | — | 8 | — | 4.8 | — | — | — |
| Shore A, Hardness | 58 | 59 | 59 | 60 | 67 | 68 | 67 |
| Heat Buildup ΔT, °C. | 24.3 | 20.7 | 24.5 | 20.8 | 35.7 | 25.0 | 26 |
| % Resilience | 76.0 | 76.9 | 75.7 | 77.4 | 70.0 | 73.7 | 72.7 |
| Mooney Minimum | 40 | 37 | 37.5 | 37 | 60.5 | 44.5 | — |
| Scorch 5 pt. rise, min. | 9.3 | 9.2 | 12.5 | 11.8 | 14.3 | 12.0 | — |
| ML-4 (140° C.) | 42 | 38 | 39.5 | 39 | 64.5 | 47.5 | — |
| Dispersion | 8 | 7 | 7 | 7 | 5 | 7 | 8 |

*Using Hi Sil 233
**Adding Si 69 and Hi Sil 233 during compounding.
***Si 69 added to Hi Sil 233 by soaking in an ethanolic solution of Si 69 and evaporating the ethanol prior to compounding.

Reasonable variations and modifications which will become apparent to those skilled in the art can be made in this invention without departing from the spirit and scope thereof.

We claim:

1. Process to produce a silica reinforcing agent by acid precipitation of silica comprising
    (a) precipitating silica from an aqueous silicate solution by adding acid thereto to form a silica comprising slurry,
    (b) incorporating a reinforcing promoter into said slurry by adding said reinforcing promoter prior to, during or after step (a) but prior to any heat treatment or drying of the silica obtained in step (a) to obtain a promoted silica containing slurry, said promoter being defined as a chemical compound having at least one first molecular moiety that exhibits an affinity to silica or that is capable of attaching itself to the silica, and at least one second molecular moiety that is capable of forming a bond with a carbon atom,
    (c) recovering said promoted silica from said slurry.

2. A process in accordance with claim 1 wherein
    (a) said reinforcing promoter is added to the slurry obtained in step (a) such as to produce a promoter containing slurry,
    (b) the promoter containing slurry is thoroughly stirred,
    (c) the promoter containing slurry is washed and
    (d) the washed promoter containing slurry is dried.

3. A promoted silica obtained by the process of claim 2.

4. A promoted silica of claim 3 containing about 100 parts by weight of precipitated silica and about 1 to 12 parts by weight of promoter.

5. A rubber composition comprising
    (a) 100 parts by weight of a rubber selected from the group consisting of natural rubber, silica reinforceable synthetic polymers and copolymers and mixtures of these rubbers,
    (b) 25 to 60 parts by weight of promoted silica of claim 3 or 4.

6. A process for the production of an article of reinforced rubber comprising
    (a) mixing 100 parts by weight of a rubber selected from the group consisting of natural rubber, silica reinforceable synthetic polymers and copolymers and mixtures of such rubbers with 25 to 60 parts by weight of a promoted silica of claim 3 or 4, said mixing being carried out at a temperature well below the temperature of reaction or activation between the promoted silica and the rubber,
    (b) shaping said article from said mixture obtained in step (a) and subjecting said article to the activating temperature at which significant reinforcing or crosslinking of the rubber with the promoted silica occurs,
    (c) recovering the shaped reinforced article.

* * * * *